United States Patent [19]

Kanagawa et al.

[11] Patent Number: 4,632,966

[45] Date of Patent: Dec. 30, 1986

[54] THERMOSETTING RESIN COMPOSITION OF AN ALLYLATED NOVOLAK AND A BIS-MALEIMIDE

[75] Inventors: Shuichi Kanagawa, Osaka; Hisao Takagishi, Kyoto; Teruho Adachi, Hirakata; Kunimasa Kamio, Suita, all of Japan

[73] Assignee: Sumitomo Chemical Company, Limited, Osaka, Japan

[21] Appl. No.: 793,531

[22] Filed: Oct. 10, 1985

[30] Foreign Application Priority Data

| Oct. 15, 1984 [JP] | Japan | 59-215387 |
|---|---|---|
| Jul. 9, 1985 [JP] | Japan | 60-151036 |
| Jul. 23, 1985 [JP] | Japan | 60-163738 |
| Jul. 23, 1985 [JP] | Japan | 60-163739 |

[51] Int. Cl.$^4$ .......................... C08G 8/30; C08G 8/36
[52] U.S. Cl. .................................. 525/502; 525/504; 528/152; 528/159; 528/163
[58] Field of Search ................ 525/502, 504; 528/152, 528/159, 163

[56] References Cited

U.S. PATENT DOCUMENTS

| 2,290,674 | 7/1942 | D'Alelio | 528/159 X |
|---|---|---|---|
| 4,120,847 | 10/1978 | Culbertson | 528/152 X |
| 4,388,451 | 6/1983 | Culbertson et al. | 528/152 X |
| 4,500,690 | 2/1985 | La Tulip | 528/159 X |

FOREIGN PATENT DOCUMENTS

| 134099 | 11/1978 | Japan . |
|---|---|---|
| 1538470 | 1/1979 | United Kingdom . |

*Primary Examiner*—Howard E. Schain
*Attorney, Agent, or Firm*—Stevens, Davis, Miller & Mosher

[57] ABSTRACT

A thermosetting resin composition comprising an N,N'-bismaleimide compound and an allylated phenol novolak resin having partially or wholly allyl-etherified phenolic hydroxyl groups and substantially no nucleous-substituted allyl group.

15 Claims, No Drawings

THERMOSETTING RESIN COMPOSITION OF AN ALLYLATED NOVOLAK AND A BIS-MALEIMIDE

BACKGROUND OF THE INVENTION

1. Field of the Invention

The present invention relates to a thermosetting resin composition having superior processability and thermal resistance.

2. Description of the Prior Art

Various kind of thermosetting resins are so far widely used for the production of various insulators, structural materials, adhesives and the like by casting, impregnation, laminating and molding. In recent years, however, the thermosetting resins are required to be more excellent in properties, particularly in thermal resistance because of severe needs for such uses.

In order to meet such requirement, thermosetting polyimide resins have been used. However the processability thereof is not good, so that heating for the processing should be carried out at a high temperature for a long period of time.

While, there are known certain kinds of epoxy resin improved in the thermal resistance, which are good in processability. However, their thermal resistances required to a high degree, such as mechanical and electrical properties at a high temperature and durable heat degradation resistance are not yet satisfactory.

In addition, there are proposed a thermosetting composition comprising a polymaleimide and an polyallylphenol in Published unexamined Japanese Patent Application No. 994/1977, and a thermal resistant resin composition comprising maleimide compounds and polyallylphenol compounds in Published unexamined Japanese Patent Application No. 134099/1978.

However, in these compositions, particularly Novolak type resin-containing composition, there is a defect such that the allyl groups of polyallylphenol readily remain unreacted even after the curing, and the remaining allyl groups have a bad effect on the properties of the cured products. This is probably because the polyallylphenol compounds to be used may be prepared by Claisen rearrangement of polyallylether compounds, so that the allyl group and the hydroxyl group are located each other at the ortho position of the benzene ring.

Under these circumstances, the present inventors have undertaken extensive studies to find a thermosetting resin composition superior in both the thermal resistance and processability, and as a result, found that the object can be accomplished by a resin composition comprising a specified novolak type resin and a maleimide compound.

SUMMARY OF THE INVENTION

The present invention provides a thermosetting resin composition comprising an N,N'-bismaleimide compound and an allylated phenol novolak resin having partially or wholly allyl-etherified phenolic hydroxyl groups and substantially no nucleus-substituted allyl group (hereinafter referred to as allyl-etherified novolak resin for brevity).

DETAILED DESCRIPTION OF THE INVENTION

The allyl-etherified novolak resin usuable in the present invention can be prepared by reacting a phenol novolak resin which usually has 2–15 benzen ring in a molecule with an allyl halide such as allyl chloride, allyl bromide, allyl iodide, and the like in the presence of an alkali at 20°–120° C. usually.

In the reaction, the alkali is used in an amount equivalent to or more than the phenolic-OH to be allyl-etherified, and the allyl halide is used in an amount equivalent to or more than the alkali.

The above phenol novolak resin can be prepared by condensation reaction between at least one phenol compound such as phenol and aldehyde compound such as formaldehyde, furfral, acrolein and the like in a conventional manner.

In case of using the phenol novolak resin prepared from unsubstituted phenol, the allyl-etherified novolak resin can be easily obtained by carrying out the allyl-etherification reaction using allyl bromide or in a aprotic polar solvent such as dimethylformamide, dimethyl sulfoxide, N-methyl-pyrrolidone, acetonitrile, dimethyl acetamide, hexamethylphosphortriamide.

The desired allyl-etherified novolak resin can be obtained more easily using the phenol novolak resin prepared from substituted phenols. Accordingly, substituted phenols are preferred as the phenol compound usable in the present invention.

The substituted phenols include allyl-, alkenyl-, aryl-, aralkyl- or halogen-substituted phenols. Examples thereof include cresols, ethyl phenols, isopropylphenols, butylphenols, octylphenols, nonylphenols, vinylphenols, isopropenylphenols, phenylphenols, benzylphenols, chlorophenols, bromophenols, xylenols, methylbutylphenols and the like. Of these, particularly preferred is cresols.

In the present invention, the allyl-etherified novolak resin includes the novolak resins of which the phenolic hydroxyl groups are both partially allyl-etherified, and wholly allyl etherified.

The former is hereinafter referred to as partially-allyl-etherified resin.

The latter, in other words, the allyl-etherified novolak resin having substantially no phenolic hydroxyl group, which is hereinafter referred to as wholly allyl-etherified resin, is more preferable from viewpoint of the thermal resistance.

The N,N'-bismaleimide compound usable in the present invention includes N,N'-diphenylmethane-bismaleimides, N,N'-phenylene-bismaleimides, N,N'-diphenyl ether bismaleimides, N,N'-diphenylsulphone-bismaleimides, N,N'-dicyclohexyl-methan-bismaleimides, N,N'-xylen-bismaleimides, N,N'-tolylene-bismaleimides, N,N'-xylylene-bismaleimides, N,N'-diphenyl-cyclohexane-bismaleimides, N,N'-ethylene-bismaleimide, N,N'-hexamethylene-bismaleimide and the like.

Beside, there are also usable prepolymers having the N,N'-bismaleimide skelton at their terminals, which can be prepared by addition reaction between the aforesaid N,N'-bismaleimide compound and a diamine. Of these, particularly preferred is N,N'-diphenylmethane-bismaleimide.

The amount of the allyl-etherified novolak resin to be mxied with the N,N'-bismaleimide compound is from 0.2 to 3.0 equivalents per equivalent of the N,N'-bismaleimide compound. In this specification, the term "equivalent" is the one based on the double bond. And the amount of the allyl-etherified novolak resin may vary depending on the etherification degree. The wholly allyl-etherified resin can be used in an amount of 0.2 to 3, preferably 0.5 to 2.0 equivalents per equivalent of the N,N'-bismaleimide compound. While, the partially allyl-etherified resin can be used in an amount of 0.2 to 2.0 equivalents per equivalent of the N,N'-bismaleimide compound. Amounts larger than those defined above are not preferable because of increase of the remaining unreacted allyl group in the cured product.

The present thermosetting resin composition can be obtained by mixing the allyl-etherified novolak resin, the N,N'-bismaleimide compound and, if desired, other conventional additives in a conventional manner. Various fillers and reinforcing materials, as the other conventional additives, may be mixed at a relatively low temperature using mixers, kneaders, rolls and the like thereby producing a casting or molding materials. If desired, the present resin composition may further contain a conventional thermosetting resin such as epoxy resin, unsaturated polyester resin, phenol resin, silicone resin, triazine resin and the like.

The resin composition of the present invention can be easily cured by heating. If desired, initiator such as azo compounds, organic peroxide compounds and the like may be added to accelerate the curing. And it may be dissolved in a solvent to prepare a liquid composition coated on various reinforcing fibers such as glass fiber, carbon fiber and the like, thereby obtaining laminating materials.

If desired, the N,N'-bismaleimide compound may be reacted in advance with the allyl-etherified novolak as far as no gelation occurs.

The thermosetting resin composition of the present invention is superior in processability and thermal resistance, and useful to produce cured resin products such as castings, impregnants, laminates and molding materials. The present invention is illustrated in more detail with reference to the following Reference Examples and Examples, which are not, however, to be interpreted as limitting the invention thereto. All parts in these Examples are by weight.

REFERENCE EXAMPLE 1

In a reactor equipped with a thermometer, stirrer, dropping funnel and condenser were placed 118 parts (1 equivalent) of O-cresol novolak resin having a softening point of 100° C. and 155 parts of acetone as a solvent, and the resin was completely dissolved therein. Thereafter, 133 parts (1.1 equivalents) of allyl bromide was added thereto. The mixture was thoroughly stirred.

157 Parts (1.1 equivalents) of 28% aqueous sodium hydroxide solution was added dropwise to the above mixture over 2 hours, while keeping the reaction temperature at 60° C. The resulting mixture was kept at 60° C. for additional 3 hours.

Successively the aqueous layer was removed, and acetone and unreacted allyl bromide were distilled out of the reaction system. 155 Parts of toluen was added to the residue. The mixture was washed with water, and filtered to remove a very small amount of inorganic salts.

The filtrate was concentrated to obtain 154 parts of pale yellow, viscous liquid resin having allylation ratio of 102% and phenolic-OH content of 0.2%.

This resin is hereinafter referred to as ALN-O.

REFERENCE EXAMPLE 2

Reference Example 1 was repeated, provided that allyl bromide was used in an amount of 102 parts (0.84 equivalent) and 28% aqueous sodium hydroxide solution was used in an amount of 114 parts (0.8 equivalent), whereby 142 parts of yellowish orange semisolid resin having allylation ratio of 80% and OH-equivalent of 750 g/eq. was obtained.

This resin is hereinafter referred to as ALN-1.

REFERENCE EXAMPLE 3

Reference Example 1 was repeated, provided that allyl bromide was used in an amount of 76 parts (0.63 equivalent) and 28% aqueous sodium hydroxide solution was used in an amount of 86 parts (0.6 equivalent), whereby 135 parts of yellowish orange semisolid resin having allylation ratio of 60% and OH-equivalent of 355 g/eq. was obtained.

This resin is hereinafter referred to as ALN-2.

REFERENCE EXAMPLE 4

Reference Example 1 was repeated, provided that phenol novolak resin having a softening point of 85° C. was used in an amount of 104 parts (1 equivalent) instead of O-cresol novolak in Reference Example 1, whereby 136 parts of viscous liquid resin having allylation ratio of 98% (in that nucleus allyl group is 1%) and OH-content of 1% or less i.e. containing no phenol-OH substantially, was obtained.

This resin is hereinafter referred to as ALPN-1.

REFERENCE EXAMPLE 5

In a reactor equipped with a thermometer, stirrer, dropping funnel and condenser were placed 104 parts (1 equivalent) of phenol novolak resin having a softening point of 90° C. and 420 parts of N,N'-dimethylformamide as a solvent, and the resin was completely dissolved therein. Thereafter 33 parts (0.8 equivalent) of 97% sodium hydroxide was added thereto. The mixture was thoroughly stirred.

65 Parts (0.85 equivalent) of allyl chloride was added dropwise to the above mixture over 1 hours, while keeping the reaction temperature at 40° C. After elevated the temperature to 50° C., the resulting mixture was kept at 50° C. for additional 5 hours. Successively, N,N'-dimethylformamide was distilled out of the reaction system. 155 Parts of toluen was added to the residue. The mixture was washed with water, and filtered to remove inorganic salts.

The filtrate was concentrated to obtain 128 parts of reddish orange semisolid resin having allylation ratio of 80% and no nucleus allyl group.

This resin is hereinafter referred to as ALPN-2.

REFERENCE EXAMPLE 6

Reference Example 1 was repeated, provided that O-phenyl phenol novolak resin having a softening point of 98° C. was used in amount of 180 parts (1 equivalent) instead of O-cresol novolak in Reference Example 1, whereby 207 parts of reddish orange semisolid resin having allylation ratio of 98% and phenol-OH content of 0.4%.

This resin is hereinafter referred to as ALN-P.

EXAMPLE 1

ALN-O, obtained in Reference Example 1, N,N'-4,4'-diphenylmethane bismaleimide [produced by Mitsui Toatsu Chemical Co. (hereinafter referred to as BMI)] and dicumylperoxide [hereinafter referred to DCP] were mixed in a ratio described in Table 1 to obtain each resin composition, which was then measured for Stroke cure gelation time.

The result is as shown in Table 1. Table 1 shows that the composition of the present invention shows good curability even at a relatively low temperature.

TABLE 1

| Equivalent ratio(*) | 0.5 | 0.5 | 0.5 | 0.67 | 0.67 | 0.67 |
|---|---|---|---|---|---|---|
| DCP (wt. %) | 0 | 0.5 | 1.0 | 0 | 0.5 | 1.0 |
| Gelatin time(**) | | | | | | |
| 160° C. | 50' | 5'30" | 2'40" | 44' | 7' | 3'30" |
| 170° C. | — | 1'50" | 1' | — | 2'20" | 1'10" |
| 180° C. | 18' | — | — | 11'45" | — | — |
| 200° C. | 6'40" | — | — | 4'10" | — | — |

(*)Hereinafter $\frac{\text{"Equivalent of allyl etherified novolak resin"}}{\text{Equivalent of Bismaleimide compounds}}$ is referred to as equivalent ratio.
(**)' means minute(s) and " means second(s).

EXAMPLE 2 AND COMPARATIVE EXAMPLE

ALN-O, obtained in Reference Example 1, and BMI were mixed in a ratio described in Table 2 to obtain each resin composition, which was then heated at 200° C. over 5 hours to obtain cured resin.

As a comparative example, same equivalents of N,N'-tetraglycidyl-4,4'-diaminodiphenylmethane (Sumiepoxy ELM-434: produced by Sumitomo Chemical Co.) and 4,4'-diaminodiphenylsulphone were mixed and 0.5% of $BF_3$.monoethylamine salt was added as curing accelerator to obtain resin composition as a themral resistant epoxy resin composition, which was then heated at 200° C. over 3 hours to obtain cured resin product. Each cured resin product was then subjected to the thermogravimetric analysis. The result obtained was as shown in Table 2.

Table 2 shows that each composition of the present invention is superior in thermal resistance to the thermal resistant epoxy resin of the comparative example.

TABLE 2

| | Example 2 | | Comparative Example |
|---|---|---|---|
| Equivalent ratio | 0.5 | 0.67 | — |
| TW(*1)°C. | 335 | 343 | 270 |
| Thermogravimetric index(*2) | 473 | 484 | 399 |

(*1)Temperature at which weight loss begins.
(*2)According to NEMA standard

EXAMPLE 3

Each allyl-etherified novolak resin obtained in Reference Examples 1 to 6, and each N,N'-bismaleimide compounds described in Table 3 were mixed each other in a ratio described in Table 3 to obtain resin compositions.

As Comparative Example, diallylbisphenol A obtained according to the way described in Published Unexamined Japanese Patent Application No. 994/1977 (hereinafter referred to as ABPA) and O-allylphenol novolak obtained according to the way described in Published Unexamined Japanese Patent Application No. 134099/1978 were used. Each of them and BMI were mixed each other in a ratio described in Table 3 to obtain resin composition. And then each resin composition described above was in B-stage at 180° C., press-molded at 50 kg/cm$^2$, 200° C. over 1 hour and post-cured at 230° C. for additional 5 hours to obtain each cured resin products.

The physical properties of each cured resin product are shown in Table 3.

TABLE 3

| | allyl compound | | | | | | | | | | | | | Comparative Example | |
|---|---|---|---|---|---|---|---|---|---|---|---|---|---|---|---|
| | | | | | | | | Example | | | | | | | |
| N,N'—bismaleimide compound(*1) | ALN-0 | | | | ALN-1 | | | ALN-2 | | ALPN-1 | | ALPN-2 | ALN-P | ABPA | APN |
| | BMI | | BMJ | | | | | | | BMI | | | | | |
| Equivalent ratio | 1.0 | 0.5 | 1.5 | 2.0 | 1.0 | 0.6 | 1.0 | 1.5 | 1.0 | 1.0 | 2.0 | 1.0 | 1.0 | 1.0 | 1.0 |
| Tg(*2) | 305 | 303 | 302 | 300 | 297 | 305 | 300 | 298 | 279 | 305 | 302 | 304 | 299 | 265 | 270 |
| Thermal decomposition temperature (°C.) | | | | | | | | | | | | | | | |
| in N$_2$ | 469 | 444 | 458 | 450 | 472 | 467 | 464 | 449 | 452 | 453 | 449 | 441 | 462 | 418 | 423 |
| in Air | 467 | 457 | 455 | 448 | 470 | 465 | 462 | 448 | 448 | 450 | 445 | 437 | 459 | 412 | 417 |
| Weight reduction (%)(*3) | 7.7 | 9.4 | 9.6 | 10.8 | 7.5 | 8.3 | 8.7 | 10.2 | 9.6 | 9.7 | 10.1 | 10.3 | 8.4 | 14.0 | 12.8 |
| Flexural Strength (kg/mm$^2$) | 10.1 | 7.4 | 12.6 | 14.2 | 15.4 | 11.3 | 13.7 | 13.2 | 14.9 | — | — | — | 8.6 | 14.0 | 10.6 |

(*1)BMJ means N,N—4,4'-diphenylether bismaleimide
(*2)by TMA method
(*3)after 316° C. × 7 days

What is claimed is:

1. A thermosetting resin composition comprising an N,N'-bismaleimide compound and an allylated phenol novolak resin having partially or wholly allyl-etherified phenolic hydroxyl groups and substantially no nucleus-substituted allyl group.

2. A thermosetting resin composition according to claim 1, wherein the allylated phenol novolak resin is the one prepared by reacting a phenol novolak resin with an allyl halide.

3. A thermosetting resin composition according to claim 2, wherein the phenol novolak resin is the one prepared by reacting a substituted or unsubstituted phenol compound with an aldehyde compound.

4. A thermosetting resin composition according to claim 3, wherein the phenol novolak resin is the one prepared from a substituted phenol selected from cresols, ethylphenols, isopropylphenols, butylphenols, octylphenols, nonylphenols, vinylphenols, isopropenylphenols, phenylphenols, benzylphenols, chlorophenols, bromophenols, xylenols, methylbutylphenols.

5. A thermosetting resin composition according to claim 4, wherein the substituted phenol is cresols.

6. A thermosetting resin composition according to claim 1, wherein the allylated phenol novolak resin is the one having wholly allyl-etherified phenolic hydroxyl group.

7. A thermosetting resin composition according to claim 4, wherein the allylated phenol novolak resin is the one having wholly allyl-etherified phenolic hydroxyl group.

8. A thermosetting resin composition according to claim 5, wherein the allylated phenol novolak resin is the one having wholly allyl-etherified phenolic hydroxyl group.

9. A thermosetting resin composition according to claim 1, wherein the N,N'-bismaleimide compound is N,N'-diphenylmethane-bismaleimide.

10. A thermosetting resin composition according to claim 6, wherein the amount of the allyl-etherified novolak resin is from 0.2 to 3.0 equivalents per equivalent of the N,N'-bismaleimide compounds.

11. A thermosetting resin composition according to claim 6, wherein the amount of the allyl-etherified novolak resin is from 0.2 to 2.0 equivalents per equivalent of the N,N'-bismaleimide compounds.

12. A therosetting resin composition according to claim 4, wherein the amount of the allyl-etherified novolak resin is from 0.2 to 2.0 equivalents per equivalent of the N,N'-bismaleimide compounds.

13. A method of producing a cured resin product which comprises using a thermosetting resin composition according to claim 1.

14. A method according to claim 13, wherein a cured resin product is one selected from a casting, an impregnant, a laminate and a molding material.

15. A cured resin product obtained according to claim 13.

* * * * *